United States Patent [19]

Mosher

[11] Patent Number: 4,650,840

[45] Date of Patent: Mar. 17, 1987

[54] TUNGSTEN CONTAINING RESOLES

[75] Inventor: Paul V. Mosher, Torrance, Calif.

[73] Assignee: Hitco, Irving, Calif.

[21] Appl. No.: 786,635

[22] Filed: Oct. 11, 1985

Related U.S. Application Data

[60] Division of Ser. No. 691,769, Jan. 16, 1985, Pat. No. 4,585,837, which is a continuation-in-part of Ser. No. 479,880, Mar. 29, 1983, abandoned.

[51] Int. Cl.$^4$ .............................................. C08G 8/28
[52] U.S. Cl. .................................. 528/506; 525/480; 525/504; 528/129; 528/138; 528/153; 528/154; 528/161; 528/395
[58] Field of Search ....................... 525/480, 504, 506; 528/129, 138, 153, 165, 154, 9

[56] References Cited

U.S. PATENT DOCUMENTS

| | | | |
|---|---|---|---|
| 2,667,466 | 1/1954 | Nagy | 528/153 X |
| 2,748,101 | 5/1956 | Shappell | 528/165 X |
| 2,941,918 | 6/1960 | West et al. | 528/129 X |
| 3,298,973 | 1/1967 | Quarles et al. | 528/138 |
| 3,494,892 | 2/1970 | Huster | 528/129 |
| 3,740,358 | 6/1973 | Christie et al. | 525/506 X |
| 4,045,398 | 8/1977 | Dahms | 525/506 X |
| 4,185,043 | 1/1980 | Shaffer | 525/364 |
| 4,256,868 | 3/1981 | Tarasen | 528/9 |
| 4,284,744 | 8/1981 | Shaffer | 528/9 X |
| 4,317,901 | 3/1982 | Cosway | 528/140 X |
| 4,323,667 | 4/1982 | Meyer et al. | 525/506 X |
| 4,540,764 | 9/1985 | Hinman | 528/9 |
| 4,585,837 | 4/1986 | Mosher | 525/506 |

OTHER PUBLICATIONS 1816241 07001971 DEX

*Primary Examiner*—Howard E. Schain
*Attorney, Agent, or Firm*—Roylance, Abrams, Berdo & Goodman

[57] ABSTRACT

There are disclosed thermosetting resoles containing chemically bonded boron, tungsten and/or zirconium atoms. The metal containing resoles of this invention are useful, for example, as reimpregnation resins.

4 Claims, No Drawings

TUNGSTEN CONTAINING RESOLES

CROSS REFERENCE TO RELATED APPLICATION

This is a division of application Ser. No. 691,769 filed Jan. 16, 1985, now U.S. Pat. No. 4,585,837 which is a continuation-in-part of application Ser. No. 479,880 filed Mar. 29, 1983, now abandoned.

BACKGROUND OF THE INVENTION

This invention relates to resoles containing one or more metal atoms in the polymer chain.

A reimpregnation resin is a thermosetting polymer introduced as a liquid into the characteristic void of a carbon/carbon composite. The resin is subsequently cured and heat treated, thus increasing the density of the composite. Selected polymers impart specific desired characteristics to the composite depending upon the ultimate application. Viable reimpregnation resins must maintain a suitably low viscosity during the reimpregnation process and, in addition, exhibit a relatively high char yield.

U.S. Pat. No. 4,185,043 to Robert C. Shaffer discloses thermoplastic and thermosetting polymers which incorporate tungsten and/or molybdenum metal atoms. The metal atoms are incorporated into the polymer by reacting a monomer or polymer containing at least one free carboxyl group with a reaction product of tungsten or molybdenum carbonyl and pyrrolidine to obtain a polymer. It is disclosed that the polymers are useful as reimpregnation resins.

SUMMARY OF THE INVENTION

It has now been discovered that the properties of base catalyzed thermosetting phenolic resins known as resoles may be improved by incorporating therein one or more metal atoms selected from the group consisting of boron, tungsten and/or zirconium. The novel thermosetting resoles of this invention are those containing boron atoms and tungsten atoms; boron atoms and zirconium atoms; tungsten atoms; tungsten atoms and zirconium atoms; and boron, tungsten and zirconium atoms. Such thermosetting modified phenolic resins can be prepared by reacting a resol with zirconyl acetate, boric acid or a tungsten carbonyl/pyrrolidine reaction product, with the proviso that when boric acid is used as a reactant, at least one of zirconyl acetate and tungsten carbonyl/pyrrolidine reaction product are also reacted with the resol. The metals are chemically bonded into the backbone of the polymer. These bonds are believed to be predominantly phenoxy linkages. The metal-phenoxy units are subsequently reduced to the corresponding metal carbides during heat treatment. These polymers show improved heat resistance and their respective chars display improved oxidation resistance which render them particularly useful for carbon/carbon composites.

The thermosetting modified resol resins of this invention are viscous polymers at room temperature but become much less viscous as the temperature is raised. The basic structural unit of these polymers is that formed from the reaction of hydroxy benzenes and formaldehyde in the presence of a base. The metallic precursors participate both as chain modifiers and as cross-linking agents without significantly changing the basic properties of the phenolic resin.

DETAILED DESCRIPTION OF THE INVENTION

The resoles used in the practice of this invention are well known in the art. They are obtained by reacting a phenol with an aldehyde such as formaldehyde using an alkaline catalyst. Resoles are also known as A-stage resins. For a discussion of resoles see *Polymers and Resins* by Golding, D. Van Nostrand Company Inc., pages 245-247 (1959), the disclosure of which is incorporated herein by reference. The resoles can be prepared from mono-or dihydroxy benzenes and formaldehyde.

The amount of zirconyl acetate added to the initial resin can be varied in such a manner as to obtain a resin containing from 0 to 16% zirconium.

The amount of boric acid added to the initial resin can be varied in such a manner as to obtain a resin containing from 0 to 7% boron in the cured product. Up to 15% glycerol may be added to this resin in order to improve castability.

The amount of tungsten carbonyl/pyrrolidine reaction product added to the initial resin can be varied in such a manner as to obtain a resin containing from 0 to 20% tungsten. The reaction between the tungsten carbonyl and pyrrolidine may be accomplished in one of several methods found in the literature, e.g., an article by Fowles et al entitled "The Reactions Of Group VI Metal Carbonyls With Pyrrolidine, Piperazine and Morpholine", *Inorganic Chemistry*, Vol. 3, No. 2, 1964, pages 257-259. The reaction product consisting of the pyrrolidine-tungsten carbonyl complex is ground to a fine powder for subsequent rection. The reaction product of the pyrrolidine-tungsten carbonyl complex is believed to contain at least two moles of pyrrolidine to one mole of tungsten carbonyl.

The amount of metal in the metal containing resoles may be varied by increasing or decreasing the amount of resol used in the reaction with the zirconyl acetate, boric acid or tungsten carbonyl/pyrrolidine reaction product. The zirconyl acetate, boric acid or tungsten carbonyl/pyrrolidine reaction product is reacted with the resol by combining the two materials and heating the reaction mixture, preferably within the range of about 100° to 200° C. for from about ½ to 2 hours. The amount of metal containing reactant and resol may vary widely depending upon the amount of metal desired in the final product.

Any of these metal containing resoles can be polymerized with another in any desired ratio, thus permitting the incorporation of metals into the resultant copolymer in a wide range of ratios. The only limiting factor is the maximum metal content in the primary metal resin.

The metal containing resoles of this invention display high graphitization yields which render them more desirable than other organometallic resins for use in reimpregnation of carbon/carbon composites. These resins, when carbonized or graphitized, exhibit unique energy absorbing characteristics and display improved oxidation resistance.

The metal containing polymers of this invention are also useful in preparing carbonized, high-temperature, corrosion resistant and ablative products under conditions known to those skilled in the art. Specifically, high silica fabric materials prepared by leaching glass fibers, as set forth in U.S. Pat. Nos. 2,491,761; 2,624,658; and 3,262,761 or carbonaceous fibers prepared by pyrolyzing cellulosic materials such as cotton, rayon and the like under controlled conditions, as disclosed, for example, in U.S. Pat. No. 3,294,489 may be impregnated with the metal containing resins of the present invention and thereafter pyrolyzed at temperatures of between about 800° and 5500° F. The resulting products retain a substantial and desirable amount of the original resin volume and weight, and yet are characterized by the improved ablative and temperature and corrosion resistant properties taken on as a result of the pyrolysis.

The impregnated fibrous material may be used to form molded articles, such as rocket engine nozzles and reentry materials, such as rocket nose cones. The presence of the metal atoms in the resin renders the material capable of absorbing large quantities of energy and also results in a higher density material which generally produces improved ablative properties.

The metal containing polymers of this invention may also be used to form films, coatings or castings. They may be used in combination with conventional adjuvants such as film forming prepolymers, fillers, etc. with which they are compatible. The metal containing polymers may also be cured and then carbonized and/or treated at graphitizing temperatures and the resultant material ground to provide particles which may be used as a filler in resins, elastomers, etc. to impart energy absorbing characteristics of the metal containing polymers.

The following examples illustrate the best modes contemplated for carrying out this invention. Procedure A sets forth the method for preparing a resol containing boron atoms.

Procedure A

To 15.0 parts by weight of boric acid were added 87.0 parts by weight of the phenolic resol at 66.0% by weight solids described in Example 1. This mixture was heated to 160° C. over a one hour period with stirring. To the clear, amber product thus obtained were added 60 parts by weight of dimethylformamide to solvate the product. The product can be thermally set within 20 hours at 200° C.

EXAMPLE 1

A hot solution containing 45.0 parts by weight of zirconyl acetate in 80 parts by weight of 80% acetic acid and 40 parts by weight of ethanol were added to an open resin kettle containing 131.0 parts by weight of a phenolic resol at 66.0% by weight solids. The resol was prepared from 1.5 moles of formaldehyde and 1.0 moles of phenol. This mixture was stirred well and heated to 111° C. over a 30 minute period. To this clear, amber product were added 50 parts by weight of dimethylformamide to solvate the resin. The product can be thermally set within two hours at 160° C.

EXAMPLE 2

One mole equivalent of tungsten hexacarbonyl and an excess of pyrrolidine are reacted to form the metal pyrrolidine complex. At the completion of the reaction, the product is washed and ground to a fine power. A mixture of 9.0 parts of weight of this complex and 13.3 parts by weight of a phenolic resol at 66.0% solids as described in Example 1 was heated in an open resin kettle to 140° C. over a one hour period. The resulting clear, brown resin was then solvated in six parts by weight of dimethylformamide. This resin can be thermoset within 20 hours at 200° C.

The following example shows the copolymerization of the three metal bearing resins prepared in each of Examples 1 and 2 and in Procedure A.

EXAMPLE 3

In an open resin kettle were mixed 20.0 parts by weight of the zirconium phenolic prepared as described in Example 1, 20.0 parts by weight of the boron phenolic prepared as described in Procedure A and 20.0 parts by weight of the tungsten phenolic prepared as described in Example 2. This solution was constantly stirred over a 20 minute period as the temperature was brought to 160° C. Stirring was continued and 60 parts by weight of dimethylformamide were added to further solvate. The solution was then brought back up to 120° C. over a 10 minute period. This resin can be thermoset within 17 hours at 160° C.

The following examples show the copolymerization of two metal bearing resins.

EXAMPLE 4

To 100 parts by weight of a phenolic resol at 75% solids, which was made as described in Example 1, were added 10.0 parts by weight of boric acid, and 16.0 parts by weight of ethyl alcohol. This mixture was mixed well in an open kettle and brought to 110° C. over a 20 minute period. To the resultant clear resinous product were added with mixing 20.0 parts by weight of dimethylformamide and 10.0 parts by weight of a zirconium phenolic resin at 68% solids prepared as described in Example 1. The resulting clear and homogeneous mixture, which had cooled to 72° C., was then stirred continuously for 20 minutes as the temperature was brought up to 153° C. The product, a clear, viscous, light-amber zirconium and boron containing phenolic resin, thermally set to a clear amber solid within 30 minutes at 170° C.

EXAMPLE 5

To 6.0 parts by weight of a zirconium phenolic resin at 66% solids, prepared as described in Example 1, were added 6.9 parts by weight of a tungsten phenolic resin at 58% solids, prepared as described in Example 2. The two resins were mixed well over a five minute period as the temperature rose from 24° C. to 30° C. The resulting product, an exceptionally clear, amber, zirconium and tungsten containing phenolic resin, cured within three hours at 200° C. to a clear, dark-amber thermoset solid.

EXAMPLE 6

To 13.8 parts by weight of a tungsten phenolic resin at 58% solids, prepared as described in Example 2, were added 14.5 parts by weight of a boron phenolic resin at 55% solids, prepared as described in Procedure A. The two resins were mixed well over a five minute period as the temperature rose from 24° C. to 29° C. The resulting product, a clear, dark-amber tungsten and boron containing phenolic resin, thermoset within three hours at 200° C. to a clear, dark-amber solid.

What is claimed is:

1. A process for preparing a thermosetting resin containing tungsten atoms which comprises reacting a thermosetting resol with a tungsten carbonyl/pyrrolidine reaction product.

2. A thermosetting resol obtained by the process of claim 1.

3. A process for preparing a thermosetting resole containing tungsten atoms and boron atoms which comprises reacting together a thermosetting resole containing tungsten atoms obtained by reacting a resole with a tungsten carbonyl/pyrrolidine reaction product and a thermosetting resole containing boron atoms obtained by reacting a resole with boric acid.

4. A thermosetting resole obtained by the process of claim 3.

* * * * *